United States Patent [19]
Schwarte et al.

[11] Patent Number: 5,393,570
[45] Date of Patent: Feb. 28, 1995

[54] PROCESS FOR THE PRODUCTION OF A MULTICOAT COATING, AQUEOUS COATING COMPOSITIONS, WATER-THINNABLE POLYACRYLATE RESINS AND PROCESS FOR THE PRODUCTION OF WATER-THINNABLE POLYACRYLATE RESINS

[75] Inventors: Stephan Schwarte, Emsdetten; Manfred Dangschat; Manfred Reimann, both of Drensteinfurt; Carlos Westermann, Mainhausen, all of Germany

[73] Assignee: BASF Lacke+Farben Aktiengesellschaft, Munster, Germany

[21] Appl. No.: 949,549

[22] PCT Filed: Mar. 14, 1991

[86] PCT No.: PCT/EP91/00480
§ 371 Date: Nov. 24, 1992
§ 102(e) Date: Nov. 24, 1992

[87] PCT Pub. No.: WO91/14711
PCT Pub. Date: Oct. 3, 1991

[30] Foreign Application Priority Data

Mar. 28, 1990 [DE] Germany .................. 4009932

[51] Int. Cl.⁶ .................................. B05D 3/02
[52] U.S. Cl. .................. 427/388.4; 427/407.1; 427/409; 524/512
[58] Field of Search .............. 427/407.1, 409, 388.4; 524/512

[56] References Cited

U.S. PATENT DOCUMENTS

| | | | |
|---|---|---|---|
| 4,490,417 | 12/1984 | Shindow et al. | 524/512 X |
| 4,900,774 | 2/1990 | Mitsuji et al. | 524/512 |
| 5,030,683 | 7/1991 | Nakamura | 524/512 |
| 5,077,348 | 12/1991 | Nakamura et al. | 524/512 |
| 5,093,408 | 3/1992 | Jung et al. | 524/512 |
| 5,166,254 | 11/1992 | Nickle et al. | 524/512 |
| 5,244,960 | 9/1993 | Swarup et al. | 524/512 |

OTHER PUBLICATIONS

JP-A-01104665(D1), Chemical Abstract, vol. III, No. 22, Nov. 27, 1989.

*Primary Examiner*—Michael Lusignan
*Attorney, Agent, or Firm*—Anne Gerry Sabourin

[57] ABSTRACT

The invention relates to a process for the production of a multicoat coating in which an aqueous transparent topcoat composition containing a polyacrylate resin as binder is employed. The polyacrylate resin can be obtained by adding, either successively or alternately in part amounts, a mixture of a carboxyl-containing ethylenically unsaturated monomer (a1) and a monomer (a2) free from carboxyl groups and a mixture (b) consisting of (meth)acrylic acid esters which are free from carboxyl groups, of hydroxyl-containing ethylenically unsaturated monomers and, if appropriate, of other ethylenically unsaturated monomers to an organic solvent and carrying out a polymerization in the presence of a radical-forming initiator and, at the end of the polymerization, neutralizing the resultant polyacrylate resin and dispersing it in water. The type and amount of (a1), (a2) and (b) are chosen so that the polyacrylate resin has a hydroxyl value of 40 to 200, an acid value of 20 to 100 and a glass transition temperature ($T_G$) of $-40°$ C. to $+60°$ C.

11 Claims, No Drawings

PROCESS FOR THE PRODUCTION OF A MULTICOAT COATING, AQUEOUS COATING COMPOSITIONS, WATER-THINNABLE POLYACRYLATE RESINS AND PROCESS FOR THE PRODUCTION OF WATER-THINNABLE POLYACRYLATE RESINS

The invention relates to the production of a multicoat protective and/or decorative coating on a substrate surface, in which process (1) a pigmented basecoat composition is applied to the substrate surface, (2) a polymeric film is formed from the composition applied in stage (1), (3) a transparent aqueous topcoat composition containing a water-thinnable polyacrylate resin as binder and an amino resin as crosslinking agent is applied to the basecoat obtained in this way, and subsequently (4) the basecoat is baked together with the topcoat.

The invention also relates to aqueous coating compositions, to water-thinnable polyacrylate resins and to a process for the production of water-thinnable polyacrylate resins.

The process according to the preamble of claim 1 is known. It is used especially for the production of automotive metallic finishes (cf. for example U.S. Pat. No. 3,639,147, DE-A-3,333,072 and EP-A-38,127).

For economic and ecological reasons it is desirable to employ aqueous topcoat compositions in stage (3) of the so-called basecoat/clearcoat process described above.

The topcoat compositions must be capable of application by spraying using automatic painting equipment. For this purpose their solids content must, at the spray viscosity, be sufficiently high to obtain paint films of adequate thickness with two passes of the gun (cross passes), and the compositions must furnish baked paint films of good appearance (good flow-out, high gloss, good topcoat appearance . . . ).

The aqueous topcoat composition disclosed in Example 2 of EP-A-38,127 does not meet all of the above requirements.

The object of the present invention consists in providing aqueous topcoat compositions which meet the above requirements.

Surprisingly, this object is achieved by topcoat compositions containing a water-thinnable polyacrylate resin as binder, which resin can be obtained by adding, either successively or alternately in part amounts, (I)
(a1) more than 25 to less than 60%, preferably 33 to 50%,
   by weight of an ethylenically unsaturated monomer which contains at least one carboxyl group per molecule and is copolymerizable with (b1), (b2), (b3) and (a2), or of a mixture of such monomers, together with
(a2) 40-75% by weight of an ethylenically unsaturated monomer which is free from carboxyl groups and is copolymerizable with (b1), (b2), (b3) and (a1), or of a mixture of such monomers, and a mixture (b), consisting of
(b1) a (meth)acrylic acid ester which is copolymerizable with (b2), (b3), (a1) and (a2) and is essentially free from carboxyl groups, or a mixture of such (meth)acrylic acid esters, and
(b2) an ethylenically unsaturated monomer which is copolymerizable with (b1), (b3), (a1) and (a2), contains at least one hydroxyl group per molecule and is essentially free from carboxyl groups, or a mixture of such monomers, and, if appropriate,
(b3) an ethylenically unsaturated monomer which is copolymerizable with (b1), (b2), (a1) and (a2), is essentially free from carboxyl groups and is different from (b1) and (b2), or a mixture of such monomers, to an organic solvent or solvent mixture and carrying out a polymerization in the presence of at least one polymerization initiator, and, (II) at the end of the polymerization, neutralizing, at least partially, the resultant polyacrylate resin and dispersing it in water, the sum of the proportions by weight of (a1) and (a2) always being 100% by weight and the type and amount of (b1), (b2), (b3), (a1) and (a2) being chosen so that the polyacrylate resin has a hydroxyl value of 40 to 200, preferably 60 to 140, an acid value of 20 to 100, preferably 25 to 50, and a glass transition temperature ($T_G$) of $-40°$ C. to $+60°$ C., preferably $-20°$ C. to $+40°$ C.

Aqueous coating compositions containing water-thinnable amino resins and polyacrylate resins, prepared by grafting vinyl monomers containing hydroxyl-substituted or N-alkoxyalkyl-substituted amide groups to a carboxyl-containing polyacrylate resin, are described in JP-A-1,104,665. These coating compositions are used for the coating of foodstuff cans. JP-A-1,104,665 makes no reference whatsoever to the "basecoat-clearcoat" process and to the problems related to the automatic spray application of aqueous topcoat compositions which occur in this process.

The pigmented basecoat compositions to be applied in stage (1) of the process according to the invention are well known (cf. for example U.S. Pat. No. 3,639,147, EP-A-38,127, DE-A-3,333,072 and EP-A-279,813). Basecoat compositions containing metallic pigments, in particular aluminum pigments, are preferably used in stage (1). Metallic finishes are obtained in this way.

A more detailed description of the preparation of the polyacrylate resins to be used according to the invention is preceded by an explanation of two terms used:

1) The term "(meth)acrylic acid" is occasionally used as an abbreviation for "methacrylic acid or acrylic acid".
2) The expression "essentially free from carboxyl groups" is intended to indicate that the components (b1), (b2) and (b3) can have a low carboxyl group content (but no higher than would cause a polyacrylate resin prepared from the components (b1), (b2) and (b3) to have an acid value no higher than 10). It is preferred, however, for the carboxyl group content of the components (b1), (b2) and (b3) to be kept as low as possible. Components (b1), (b2) and (b3) which are free from carboxyl groups are particularly preferred.

For the preparation of the polyacrylate resins to be used according to the invention, any ethylenically unsaturated monomer which contains at least one carboxyl group per molecule and is copolymerizable with (a2), (b1), (b2) and (b3), or a mixture of such monomers, may be used as the component (a1). Acrylic acid and/or methacrylic acid are preferably used as the component (a1). However, other ethylenically unsaturated acids having up to 6 carbon atoms in the molecule may also be used. Examples of such acids are ethacrylic acid, crotonic acid, maleic acid, fumaric acid and itaconic acid. Mono(meth)acryloyloxyethyl succinate and mono(meth)acryloyloxyethyl phthalate may likewise be used, for example, as the component (a1).

Any ethylenically unsaturated monomer which is copolymerizable with (b1), (b2), (b3) and (a1), or a mixture of such monomers, may be used as the component (a2). All the monomers listed in the description of the components (b1), (b2) and (b3) may be used as the component (a2).

Any (meth)acrylic acid ester which is copolymerizable with (b2), (b3), (a1) and (a2) and is essentially free from carboxyl groups, or a mixture of such (meth)acrylic acid esters, may be used as the component (b1). Examples are alkyl acrylates and alkyl methacrylates having up to 20 carbon atoms in the alkyl radical, such as methyl, ethyl, propyl, butyl, hexyl, ethylhexyl, stearyl and lauryl acrylate and methacrylate. Mixtures of alkyl acrylates and/or alkyl methacrylates containing at least 25% by weight of n-butyl or t-butyl acrylate and/or n-butyl or t-butyl methacrylate are preferably used as the component (b1).

Any ethylenically unsaturated monomer which is copolymerizable with (b1), (b3), (a1) and (a2), contains at least one hydroxyl group per molecule and is essentially free from carboxyl groups, or a mixture of such monomers, may be used as the component (b2). Suitable examples are hydroxyalkyl esters of acrylic acid, methacrylic acid or another $\alpha,\beta$-ethylenically unsaturated carboxylic acid. These esters may be derived from an alkylene glycol esterified with the acid or they may be obtained by reacting the acid with an alkylene oxide. Hydroxyalkyl acrylates and hydroxyalkyl methacrylates in which the hydroxyalkyl group contains up to 4 carbon atoms, reaction products of cyclic esters, for example $\Sigma$-caprolactone, and these hydroxyalkyl esters, or mixtures of these hydroxyalkyl esters or $\Sigma$-caprolactone-modified hydroxyalkyl esters are preferably used as the component (b2). Examples of such hydroxyalkyl esters are 2-hydroxyethyl acrylate, 2-hydroxypropyl acrylate, 3-hydroxypropyl acrylate, 2-hydroxypropyl methacrylate, 3-hydroxypropyl methacrylate, 2-hydroxyethyl methacrylate, 4-hydroxybutyl acrylate and 4-hydroxybutyl methacrylate. Corresponding esters of other unsaturated acids, such as ethacrylic acid, crotonic acid and similar acids having up to about 6 carbon atoms per molecule, may also be used.

Any ethylenically unsaturated monomer which is copolymerizable with (b1), (b2), (a1) and (a2), is essentially free from carboxyl groups and is different from (b1) and (b2), or a mixture of such monomers, may be used as the component (b3). Vinylaromatic hydrocarbons such as styrene, $\alpha$-alkylstyrene and vinyltoluene are preferably used as the component (b3).

The polyacrylate resins used according to the invention can be prepared by adding more than 25 to less than 60%, preferably 33 to 50%, by weight of the component (a1) together with 40–75% by weight of the component (a2) to an organic solvent or solvent mixture, carrying out polymerization in this solution in the presence of at least one polymerization initiator and adding at the end of the addition of the components (a1) and (a2) a mixture (b), consisting of the components (b1), (b2) and, if appropriate, (b3), to the organic solvent or solvent mixture and carrying out polymerization in this solution in the presence of at least one polymerization initiator. The addition of the mixture (b) should not commence before at least 60% by weight, preferably at least 80% by weight, of the components (a1) and (a2) have reacted. It is preferred not to commence the addition of the mixture (b) before the components (a1) and (a2) have essentially completely reacted. At the end of the polymerization the resultant polyacrylate resin is neutralized, at least partially, and dispersed in water. The sum of the proportions by weight of (a1) and (a2) is always 100% by weight. The type and amount of the components (a1), (a2), (b1), (b2) and (b3) are chosen so that the polyacrylate resin has a hydroxyl value of 40 to 200, preferably 60 to 140, an acid value of 20 to 100, preferably 25 to 50, and a glass transition temperature ($T_G$) of $-40°$ C. to $+60°$ C., preferably $-20°$ C. to $+40°$ C.

The mixture of (a1) and (a2) is added to the organic solvent or solvent mixture preferably within 10 to 90 minutes, particularly preferably within 30 to 75 minutes, and is polymerized in this solution in the presence of at least one free radical-forming initiator. The mixture (b) is added to the organic solvent or solvent mixture preferably within 2 to 8 hours, particularly preferably within 3 to 6 hours, and is polymerized in this solution in the presence of at least one free radical-forming initiator.

The polyacrylate resins to be used according to the invention may also be prepared by adding the mixture of (a1) and (a2) and the mixture (b) to an organic solvent or solvent mixture alternately in part amounts and carrying out the polymerization in this solution in the presence of at least one free radical-forming initiator. The part amounts should in each case consist of at least 10% by weight of the total amount of the component (a1) and (a2) or the mixture (b) to be used. The addition of a part amount should not commence before at least 60% by weight, preferably at least 80% by weight, of the preceding part amount has reacted. It is preferred not to commence the addition of a part amount before the preceding part amount has essentially completely reacted. At the end of the polymerization the resultant polyacrylate resin is neutralized, at least partially, and dispersed in water. The sum of the proportions by weight of (a1) and (a2) is always 100% by weight. The type and amount of the components (a1), (a2), (b1), (b2) and (b3) are chosen so that the polyacrylate resin has a hydroxyl value of 40 to 200, preferably 60 to 140, an acid value of 20 to 100, preferably 25 to 50, and a glass transition temperature ($T_G$) of $-40°$ C. to $+60°$ C., preferably $-20°$ C. to $+40°$ C.

In a preferred embodiment of this preparation process a part amount of the component (b) (part amount 1) consisting of 30 to 70% by weight, preferably of 40 to 60% by weight, particularly preferably of 50% by weight, of the total amount of the component (b) to be used is added in a first stage to the organic solvent or solvent mixture and is polymerized in the presence of at least one free radical-forming initiator. At the end of the addition of the part amount 1 a part amount of the mixture of (a1) and (a2) (part amount 2) consisting of 30 to 70% by weight, preferably of 40 to 60% by weight, particularly preferably of 50% by weight, of the total amount of the mixture of (a1) and (a2) to be used is added in a second stage to the organic solvent or solvent mixture and is polymerized in the presence of at least one free radical-forming initiator. At the end of the addition of the part amount 2 a part amount of the component (b) (part amount 3) consisting of 30 to 70% by weight, preferably of 40 to 60% by weight, particularly preferably of 50% by weight, of the total amount of the component (b) to be used is added in a third stage to the organic solvent or solvent mixture and is polymerized in the presence of at least one free radical-forming initiator. At the end of the addition of the part amount 3 a part amount of the mixture of (a1) and (a2) (part amount 4) consisting of 30 to 70% by weight, preferably of 40 to 60% by weight, particularly preferably of 50% by weight, of the total amount of the mixture of (a1) and (a2) to be used is added in a fourth stage to the organic solvent or solvent mixture and is polymerized in the presence of a free radical-forming initiator.

The addition of the part amounts 2, 3 and 4 should not commence before at lest 60% by weight, preferably 80% by weight, of the preceding part amount in each case has reacted. It is preferred not to commence the addition of a part amount before the preceding part amount has essentially completely reacted.

At the end of the polymerization the resultant polyacrylate resin is neutralized, at least partially, and dispersed in water. The sum of the proportions by weight of (a1) and (a2) is always 100% by weight. The type and amount of the components (a1), (a2), (b1), (b2) and (b3) are chosen so that the polyacrylate resin has a hydroxyl value of 40 to 200, preferably 60 to 140, an acid value of 20 to 100, preferably 25 to 50, and a glass transition temperature ($T_G$) of $-40°$ C. to $+60°$ C., preferably $-20°$ C. to $+40°$ C.

The addition of the part amounts 1 and 3 is preferably carried out within 1 to 4 hours, particularly preferably within 1½ to 3 hours. The addition of the part amounts 2 and 4 is carried out preferably within 5 to 30 minutes, particularly preferably within 7 to 20 minutes.

Solvents and polymerization initiators which are customary for the preparation of polyacrylate resins and suitable for the preparation of aqueous dispersions are used as the organic solvents and polymerization initiators. Examples of usable solvents are butyl glycol, 2-methoxypropanol, n-butanol, methoxybutanol, n-propanol, ethylene glycol monomethyl ether, ethylene glycol monoethyl ether, ethylene glycol monobutyl ether, diethylene glycol monomethyl ether, diethylene glycol monoethyl ether, diethylene glycol diethyl ether, diethylene glycol monobutyl ether and 3-methyl-3-methoxybutanol. Examples of usable polymerization initiators are free radical-forming initiators, for example benzoyl peroxide, t-butyl perethyl hexanoate, azobisisobutyronitrile and t-butyl perbenzoate. The polymerization is expediently carried out at a temperature of 80° to 160° C., preferably 110 to 160° C. The polymerization is terminated when all the monomers used have essentially completely reacted.

The type and amount of the components (a1), (a2), (b1), (b2) and (b3) are chosen so that the reaction product has a hydroxyl value of 40 to 200, preferably 60 to 140, an acid value of 20 to 100, preferably 25 to 50, and a glass transition temperature ($T_G$) of $-40°$ C. to $+60°$ C., preferably $-20°$ C. to $+40°$ C.

The glass transition temperatures of polyacrylate resins can be approximately calculated using the following formula:

$$\frac{1}{T_G} = \sum_{n=1}^{n=x} \frac{W_n}{T_{Gn}}$$

$T_G$ = glass transition temperature of the polyacrylate resin x = number of the various monomers copolymerized in the polyacrylate resin $W_n$ = proportion by weight of the nth monomer $T_{Gn}$ = glass transition temperature of the homopolymer obtained from the nth monomer The amount and rate of addition of the initiator are preferably controlled in such a way that the resultant polyacrylate resin has a number average molecular weight of 2500 to 20,000. It is particularly preferred to commence the initiator addition at the same time as the addition of the polymerizable components (a1), (a2) and (b) and to terminate the addition about a half-hour after the addition of the polymerizable components (a1), (a2) and (b) has terminated. The reaction mixture is then further kept at the polymerization temperature long enough (usually about 1½ hours) for all the monomers used to have essentially completely reacted. The term "essentially completely reacted" is intended to mean that 100% of the monomers used has preferably reacted, but that it is also possible for a small residual monomer content of not more than 0.5% by weight, based on the weight of the reaction mixture, to remain unreacted.

The polyacrylate resins according to the invention are prepared by using 40 to 90% by weight, preferably 40 to 80% by weight, of the component (b1), 10 to 45% by weight, preferably 12 to 35% by weight, of the component (b2), 0 to 25% by weight, preferably 8% to 18% by weight, of the component (b3), 2.5 to 15% by weight, preferably 3 to 7% by weight, of the component (a1) and 4 to 60% by weight, preferably 5 to 28% by weight, of the component (a2), the sum of the proportions by weight of (b1), (b2), (b3), (a1) and (a2) always being 100% by weight.

At the end of the polymerization the resultant polyacrylate resin is neutralized, at least partially, and dispersed in water.

Both organic bases and inorganic bases may be employed for the neutralization. Primary, secondary and tertiary amines such as ethylamine, propylamine, dimethylamine, dibutylamine, cyclohexylamine, benzylamine, morpholine, piperidine and triethanolamine are preferably used. Tertiary amines, particularly dimethylethanolamine, triethylamine, tripropylamine and tributylamine, are used particularly preferably as the neutralization agent.

The neutralization reaction is generally performed by mixing the neutralizing base with the polyacrylate resin. Enough base is preferably used in this operation for the topcoat composition to have a pH of 7–8.5, preferably 7.2 to 7.8.

The partially or completely neutralized polyacrylate resin is then dispersed by the addition of water. An aqueous polyacrylate resin dispersion formed. Some or all of the organic solvent may be distilled off, if appropriate. The polyacrylate resin dispersions according to the invention contain polyacrylate resin particles whose average particle size is preferably between 60 and 300 nm (method of measurement: laser light scatter; measuring instrument: Malvern Autosizer 2C).

Topcoat compositions according to the invention are obtained from the aqueous polyacrylate resin dispersions obtained in this way by generally known methods by admixing an amino resin and, if appropriate, other additives, for example flow control agents, UV stabilizers, transparent pigments etc.

The topcoat compositions according to the invention preferably contain enough amino resin for the weight ratio between polyacrylate resin solid and amino resin solid to be 60:40 to 90:10, particularly preferably 70:30 to 85:15.

Any amino resin which is capable of being processed with the polyacrylate resin according to the invention to a stable topcoat composition can in principle be used as crosslinking agent. Melamineformaldehyde resins which are partially or completely etherified with aliphatic alcohols having preferably 1 to 4 carbon atoms per molecule, are preferably used as crosslinking agents.

Prior to application the viscosity of the topcoat compositions according to the invention is adjusted to spray viscosity (generally 20 to 40 sec. efflux time from a DIN No. 4 cup (DIN 53211 (1974)) and their pH is adjusted to 7.0 to 8.5, preferably 7.2 to 7.8.

The topcoat compositions according to the invention
possess, at spray viscosity, a solids content sufficiently high (20 to 45% by weight, preferably 32 to 40% by weight) for paint films of adequate film thickness (the thickness of the baked paint film should preferably be between 25 and 45 μm) to be obtained using one to two passes of the spray gun (cross passes), and
furnish baked paint films having a very good appearance (good flow-out, high gloss, good topcoat appearance . . . ) and good mechanical-technological properties, and
comprise a comparatively low proportion of organic cosolvents (less than 35% by weight, based on the total solids content of binders and crosslinking agents).

When the topcoat compositions according to the invention are used together with the water-thinnable basecoat compositions for the preparation of metallic finishes, metallic finishes are obtained in which the transparent topcoat adheres particularly well to the basecoat.

In addition to the polyacrylate resin used according to the invention, the topcoat compositions according to the invention may also contain crosslinked polymeric microparticles, such as those disclosed in EP-A-38,127, and/or other compatible resins such as water-thinnable or water-soluble polyacrylate resins, polyester resins, alkyd resins or epoxy resin esters, and they may also be pigmented.

The topcoat compositions according to the invention may be employed both in production line finishing and in refinishing.

The invention is explained in greater detail in the Examples below. All parts and percentages are by weight, unless expressly stated otherwise.

A. Preparation of a topcoat composition according to the invention 33 parts by weight of butyl glycol are introduced into a steel reaction vessel fitted with a monomer feed, an initiator feed, a thermometer, oil heating and a reflux condenser and the charge is heated to 110° C. A solution of 3.5 parts by weight of t-butyl perethylhexanoate in 0.49 part by weight of butyl glycol is then added at such a rate that the addition is concluded after 1 h 15 min. The addition of a mixture of (a1): 5.6 parts by weight of acrylic acid, (a2): 3.3 parts by weight of n-butyl acrylate, 2.2 parts by weight of t-butyl acrylate and 1.1 parts by weight of hydroxypropyl acrylate is commenced at the same time as the addition of the t-butyl perethylhexanoate solution. The mixture of (a1) and (a2) is added at such a rate that the addition is concluded after 1 h.

After the t-butyl perethylhexanoate solution has been completely added, the polymerization temperature is kept at 110° C for a further 1 hour. A solution of 6.0 parts by weight of t-butyl perethyl hexanoate in 6.0 parts by weight of butyl glycol is then added at 110° C. at such a rate that the addition is concluded after 5 h 30 min. The addition of a mixture of (b1): 24.1 parts by weight of n-butyl acrylate, 21.0 parts by weight of t-butyl acrylate, 15.0 parts by weight of methyl methacrylate, (b2): 24.9 parts by weight of hydroxypropyl acrylate and (b3): 15.0 parts by weight of styrene is commenced at the same time as the addition of the t-butyl perethylhexanoate solution. The mixture of (b1), (b2) and (b3) is added at such a rate that the addition is concluded after 5 hours.

After all the t-butyl perethylhexanoate solution has been added, the polymerization temperature is kept at 110° C. for a further 1 hour.

The resultant resin solution is concentrated by vacuum distillation to a solids content of 80% by weight and is neutralized at about 80° C. with dimethylethanolamine within about 30 min. to an 80% degree of neutralization. The resin solution is then cooled to 60° C. 40 parts by weight of a 70% solution of a commercial water-thinnable melamine-formaldehyde resin (Maprenal MF927 ® in isobutanol and 0.14 part by weight of a commercial flow control agent (Fluorad FC 430 ®) are added at 60° C. and the reaction mixture is homogenized at 60° C. for 1 hour. Enough water is then added for the solids content of the dispersion to be about 60% by weight.

The resultant dispersion has the following characteristics: number average molecular weight of the polyacrylate resin obtained from (a1), (a2), (b1), (b2) and (b3): 4000, acid value of the total solids: 25.7, solids content (in % by weight; 1 h, 130° C): 59.5%.

B. Application of the transparent topcoat composition according to the invention and testing of the baked paint film The topcoat composition prepared according to section A and cooled to room temperature is adjusted with a 10% aqueous solution of dimethylethanolamine and distilled water to spray viscosity (24 sec. efflux time from DIN No. 4 cup (DIN 53 211 (1974)), and its pH is adjusted to 7.5–7.6. A commercial water-thinnable basecoat composition comprising polyurethane, polyester and melamine resin and pigmented with aluminum platelets is applied to a phosphated steel panel coated with a commercial electrodeposition coating and commercial body filler in such a way that a dry film thickness of 12–15 μm is obtained. The applied basecoat composition is dried for 10 min. at room temperature and 10 min. at 80° C. The topcoat composition produced in accordance with section A is then sprayed onto the basecoat in two cross passes with an intermediate flash-off time. Finally it is dried for 20 min. at room temperature and baked for 30 min. in a circulating air oven at 130° C. The multicoat finish obtained in this way was subjected to a number of tests. The test results are summarized in the table which follows.

| | |
|---|---|
| Solids content on application (1 h, 130° C., in % by weight) | 39.0 |
| Thickness of the transparent topcoat (μm) | 38 |
| Crosshatch (1) | 0–1 |
| Gloss (2) | 82 |

(1) Test according to DIN 53 151 including the Tesa pull-off test
(2) Degree of gloss according to DIN 67530, angle 20 degrees

We claim:

1. Process for the production of a multicoat coating on a substrate surface, wherein the process includes the steps of
   (1) applying a pigmented basecoat composition to the substrate surface,
   (2) forming a polymeric film from the composition applied in stage (1),
   (3) applying a transparent aqueous topcoat composition containing a water-thinnable polyacrylate resin as binder and an amino resin as crosslinking agent to the basecoat obtained in this way, and subsequently
   (4) baking the basecoat together with the topcoat,
   wherein the topcoat composition contains a water-thinnable polyacrylate resin as binder, which resin is obtained by adding, successively,
   (I)
      (a1) more than 25 to less than 60% by weight of an ethylenically unsaturated monomer which contains at least one carboxyl group per molecule and is copolymerizable with (b1), (b2), (b3) and (a2), or of a mixture of such monomers, together with
      (a2) 40–75% by weight of an ethylenically unsaturated monomer which is free from carboxyl groups and is copolymerizable with (b1), (b2), (b3) and (a1), or of a mixture of such monomers, and
   a mixture (b), consisting of
      (b1) a (meth)acrylic acid ester which is copolymerizable with (b2), (b3), (a1) and (a2) and is essentially free from carboxyl groups, or a mixture of such (meth)acrylic acid esters, and
      (b2) an ethylenically unsaturated monomer which is copolymerizable with (b1), (b3), (a1) and (a2), contains at least one hydroxyl group per molecule and is essentially free from carboxyl groups, or a mixture of such monomers, and, if appropriate,
      (b3) an ethylenically unsaturated monomer which is copolymerizable with (b1), (b2), (a1) and (a2), is essentially free from carboxyl groups and is different from (b1) and (b2), or a mixture of such monomers,
   to an organic solvent or solvent mixture and carrying out a polymerization in the presence of at least one polymerization initiator, the addition of the mixture (b) commencing only when at least 60% by weight of the components (a1) and (a2) have reacted or
   by adding the above alternately in part amounts, to an organic solvent or solvent mixture and carrying out the polymerization in the presence of at least one polymerization initiator, the part amounts consisting in each case of at least 10% by weight of the total amount to be used of the component (a1) and (a2) and the mixture (b) and the addition of a part amount commencing only when at least 60% by weight of the preceding part amount has reacted, and
   (II)
   at the end of the polymerization, neutralizing, at least partially, the resultant polyacrylate resin and dispersing it in water, the sum of the proportions by weight of (a1) and (a2) always being 100% by weight and the type and amount of (b1), (b2), (b3), (a1) and (a2) being chosen so that the polyacrylate resin has a hydroxyl value of 40 to 200, an acid value of 20 to 100, and a glass transition temperature ($T_G$) of $-40°$ C. to $+60°$ C.

2. The process as claimed in claim 1, wherein an aqueous basecoat composition, is applied in stage (1).

3. The process as claimed in claim 1, wherein a part amount of the component (b) (part amount 1) comprising 30 to 70% by weight, of the total amount of the component (b) to be used is added first, a part amount of the mixture of (a1) and (a2) (part amount 2) comprising 30 to 70% by weight of the total amount of the mixture of (a1) and (a2) to be used is added subsequently, a part amount of the component (b) (part amount 3) consisting of 30 to 70% by weight of the total amount of the component (b) to be used is added subsequently, and a part amount of the mixture of (a1) and (a2) (part amount 4) comprising 30 to 70% by weight of the total amount of the mixture of (a1) and (a2) to be used is added finally, the sum of the proportions by weight of the part amounts 1 and 3 and the sum of the proportions by weight of the part amounts 2 and 4 always being 100% by weight.

4. The process as claimed in claim 1, wherein polymerization is carried out at a temperature of 80° to 160° C. in the presence of at least one free radical-forming initiator and wherein the addition of the part amount 1 takes 1 to 4 hours, the addition of the part amount 2 takes 5 to 30 minutes, the addition of the part amount 3 takes 1 to 4 hours and the addition of the part amount 4 takes 5 to 30 minutes.

5. Transparent aqueous topcoat compositions containing a water-thinnable polyacrylate resin as binder and an amino resin as crosslinking agent, wherein the water-thinnable polyacrylate resin is obtained by adding, successively,
   (I)
      (a1) more than 25 to less than 60% by weight of an ethylenically unsaturated monomer which contains at least one carboxyl group per molecule and is copolymerizable with (b1), (b2), (b3) and (a2), or of a mixture of such monomers, together with
      (a2) 40–75% by weight of an ethylenically unsaturated monomer which is free from carboxyl groups and is copolymerizable with (b1), (b2), (b3) and (a1), or of a mixture of such monomers, and
   a mixture (b), comprising
      (b1) a (meth)acrylic acid ester which is copolymerizable with (b2), (b3), (a1) and (a2) and is essentially free from carboxyl groups, or a mixture of such (meth)acrylic acid esters, and
      (b2) an ethylenically unsaturated monomer which is copolymerizable with (b1), (b3), (a1) and (a2), contains at least one hydroxyl group per molecule and is essentially free from carboxyl groups, or a mixture of such monomers, and, if appropriate,
      (b3) an ethylenically unsaturated monomer which is copolymerizable with (b1), (b2), (a1) and (a2), is essentially free from carboxyl groups and is different from (b1) and (b2), or a mixture of such monomers,
   to an organic solvent or solvent mixture and carrying out a polymerization in the presence of at least one polymerization initiator, the addition of the mixture (b) commencing only when at least 60% by weight of the components (a1) and (a2) have reacted or by adding the above alternately, in part amounts, to an organic solvent or solvent mixture and carrying out the polymerization in the presence of at least one polymerization initiator, the part amounts consisting in each case of at least 10% by weight of the total amount to be used of the component (a1) and (a2) and the mixture (b) and the addition of a part amount commencing only when at east 60% by weight of the preceding part amount has reacted, and (II) at the end of the polymerization, neutralizing, at least partially, the resultant polyacrylate resin and dispersing it in water, the sum of the proportions by weight of (a1) and (a2) always being 100% by weight and the type and amount of (b1), (b2), (b3), (a1) and (a2) being chosen so that the polyacrylate resin has a hydroxyl value of 40 to 200, an acid value of 20 to 100, and a glass transition temperature ($T_G$) of $-40°$ C. to $+60°$ C.

6. The coating composition as claimed in claim 5, wherein a part amount of the component (b) (part amount 1) comprising 30 to 70% by weight of the total amount of the component (b) to be used is added first, a part amount of the mixture of (a1) and (a2) (part amount 2) comprising 30 to 70% by weight of the total amount of the mixture of (a1) and (a2) to be used is added subsequently, a part amount of the component (b) (part amount 3) comprising 30 to 70% by weight of the total amount of the component (b) to be used is added subsequently, and a part amount of the mixture of (a1) and (a2) (part amount 4) comprising 30 to 70% by weight of the total amount of the mixture of (a1) and (a2) to be used is added finally, the sum of the proportions by weight of the part amounts 1 and 3 and the sum of the proportions by weight of the part amounts 2 and 4 always being 100% by weight.

7. The coating composition as claimed in claim 5, wherein polymerization is carried out at a temperature of 80° to 160° C. in the presence of at least one free radical-forming initiator and wherein the addition of the part amount 1 takes 1 to 4 hours, the addition of the part amount 2 takes 5 to 30 minutes, the addition of the part amount 3 takes 1 to 4 hours and the addition of the part amount 4 takes 5 to 30 minutes.

8. Water-thinnable polyacrylate resins which are obtained by adding, successively, (I)
  (a1) more than 25 to less than 60% by weight of an ethylenically unsaturated monomer which contains at least one carboxyl group per molecule and is copolymerizable with (b1), (b2), (b3) and (a2), or of a mixture of such monomers, together with
  (a2) 40–75% by weight of an ethylenically unsaturated monomer which is free from carboxyl groups and is copolymerizable with (b1), (b2), (b3) and (a1), or of a mixture of such monomers, and
a mixture (b), comprising
  (b1) a (meth)acrylic acid ester which is copolymerizable with (b2), (b3), (a1) and (a2) and is essentially free from carboxyl groups, or a mixture of such (meth)acrylic acid esters, and
  (b2) an ethylenically unsaturated monomer which is copolymerizable with (b1), (b3), (a1) and (a2), contains at least one hydroxyl group per molecule and is essentially free from carboxyl groups, or a mixture of such monomers, and, if appropriate,
  (b3) an ethylenically unsaturated monomer which is copolymerizable with (b1), (b2), (a1) and (a2), is essentially free from carboxyl groups and is different from (b1) and (b2), or a mixture of such monomers,
to an organic solvent or solvent mixture and carrying out a polymerization in the presence of at least one polymerization initiator, the addition of the mixture (b) commencing only when at least 60% by weight of the components (a1) and (a2) have reacted or by adding the above alternately, in part amounts, to an organic solvent or solvent mixture and carrying out the polymerization in the presence of at least one polymerization initiator, the part amounts consisting in each case of at least 10% by weight of the total amount to be used of the component (a1) and (a2) and the mixture (b) and the addition of a part amount commencing only when at least 60% by weight of the preceding part amount has reacted, and (II)
at the end of the polymerization, neutralizing, at least partially, the resultant polyacrylate resin and dispersing it in water, the sum of the proportions by weight of (a1) and (a2) always being 100% by weight and the type and amount of (b1), (b2), (b3), (a1) and (a2) being chosen so that the polyacrylate resin has a hydroxyl value of 40 to 200, an acid value of 20 to 100, and a glass transition temperature ($T_G$) of $-40°$ C. to $+60°$ C.

9. The polyacrylate resin as claimed in claim 8, wherein a part amount of the component (b) (part amount 1) comprising 30 to 70% by weight of the total amount of the component (b) to be used is added first, a part amount of the mixture of (a1) and (a2) (part amount 2) comprising 30 to 70% by weight of the total amount of the mixture of (a1) and (a2) to be used is added subsequently, a part amount of the component (b) (part amount 3) comprising 30 to 70% by weight of the total amount of the component (b) to be used is added subsequently, and a part amount of the mixture of (a1) and (a2) (part amount 4) comprising 30 to 70% by weight of the total amount of the mixture of (a1) and (a2) to be used is added finally, the sum of the proportions by weight of the part amounts 1 and 3 and the sum of the proportions by weight of the part amounts 2 and 4 always being 100% by weight.

10. A process for the preparation of water-thinnable polyacrylate resins, which comprises adding successively (I)
  (a1) more than 25 to less than 60% by weight of an ethylenically unsaturated monomer which contains at least one carboxyl group per molecule and is copolymerizable with (b1), (b2), (b3) and (a2), or of a mixture of such monomers, together with
  (a2) 40–75% by weight of an ethylenically unsaturated monomer which is free from carboxyl groups and is copolymerizable with (b1), (b2), (b3) and (a1), or of a mixture of such monomers, and
a mixture (b), comprising
  (b1) a (meth)acrylic acid ester which is copolymerizable with (b2), (b3), (a1) and (a2) and is essentially free from carboxyl groups, or a mixture of such (meth)acrylic acid esters, and
  (b2) an ethylenically unsaturated monomer which is copolymerizable with (b1), (b3), (a1) and (a2), contains at least one hydroxyl group per molecule and is essentially free from carboxyl groups, or a mixture of such monomers, and, if appropriate, (b3) an ethylenically unsaturated monomer which is copolymerizable with (b1), (b2), (a1) and (a2), is essentially free from carboxyl groups and is different from (b1) and (b2), or a mixture of such monomers, to an organic solvent or solvent mixture and carrying out a polymerization in the presence of at least one polymerization initiator, the addition of the mixture (b) commencing only when at least 60% by weight of the components (a1) and (a2) have reacted or by adding the above alternately, in part amounts, to an organic solvent or solvent mixture and carrying out the polymerization in the presence of at least one polymerization initiator, the part amounts consisting in each case of at least 10% by weight of the total amount to be used of the component (a1) and (a2) and the mixture (b) and the addition of a part amount commencing only when at east 60% by weight of the preceding part amount has reacted, and (II) at the end of the polymerization, neutralizing, at least partially, the resultant polyacrylate resin and dispersing it in water, the sum of the proportions by weight of (a1) and (a2) always being 100% by weight and the type and amount of (b1), (b2), (b3), (a1) and (a2) being chosen so that the polyacrylate resin has a hydroxyl value of 40 to 200, an acid value of 20 to 100, and a glass transition temperature ($T_G$) of $-40°$ C. to $+60°$ C.

11. The process as claimed in claim 10 wherein a part amount of the component (b) (part amount 1) comprising 30 to 70% by weight of the total amount of the component (b) to be used is added first, a part amount of the mixture of (a1) and (a2) (part amount 2) comprising 30 to 70% by weight of the total amount of the mixture of (a1) and (a2) to be used is added subsequently, a part amount of the component (b) (part amount 3) comprising 30 to 70% by weight of the total amount of the component (b) to be used is added subsequently, and a part amount of the mixture of (a1) and (a2) (part amount 4) comprising 30 to 70% by weight of the total amount of the mixture of (a1) and (a2) to be used is added finally, the sum of the proportions by weight of the part amounts 1 and 3 and the sum of the proportions by weight of the part amounts 2 and 4 always being 100% by weight.

* * * * *